US009281529B2

(12) United States Patent
Marzullo et al.

(10) Patent No.: US 9,281,529 B2
(45) Date of Patent: Mar. 8, 2016

(54) PROTECTIVE EDGE SEAL HAVING ALKALI METAL IONS FOR MEMBRANE ION EXCHANGE

(75) Inventors: Jesse M. Marzullo, Enfield, CT (US); Laura Roen Stolar, South Windsor, CT (US)

(73) Assignee: Audi AG, Ingolstadt (DE)

(*) Notice: Subject to any disclaimer, the term of this patent is extended or adjusted under 35 U.S.C. 154(b) by 330 days.

(21) Appl. No.: 13/261,621

(22) PCT Filed: Sep. 20, 2010

(86) PCT No.: PCT/US2010/002560
§ 371 (c)(1),
(2), (4) Date: Mar. 19, 2013

(87) PCT Pub. No.: WO2012/039699
PCT Pub. Date: Mar. 29, 2012

(65) Prior Publication Data
US 2013/0216933 A1     Aug. 22, 2013

(51) Int. Cl.
*H01M 2/08*   (2006.01)
*H01M 8/02*   (2006.01)
*H01M 8/10*   (2006.01)

(52) U.S. Cl.
CPC .......... *H01M 8/0282* (2013.01); *H01M 8/0284* (2013.01); *H01M 8/1023* (2013.01); *H01M 8/1039* (2013.01); *Y02E 60/521* (2013.01)

(58) Field of Classification Search
CPC ............ H01M 8/0282; H01M 8/0284; H01M 8/1023; H01M 8/1039
USPC .................. 429/482, 469, 494, 508
See application file for complete search history.

(56) References Cited

U.S. PATENT DOCUMENTS

| 5,264,299 A | 11/1993 | Krasij et al. |
| 6,861,173 B2 | 3/2005 | Bhaskar et al. |

(Continued)

FOREIGN PATENT DOCUMENTS

| JP | 2000-215903 A | 8/2000 |
| JP | 2005267904 A * | 9/2005 |

(Continued)

OTHER PUBLICATIONS

Miura et al., Machine translation of JP 2005-267904 A, Sep. 2005.*

(Continued)

*Primary Examiner* — Sean P Cullen
(74) *Attorney, Agent, or Firm* — Seed IP Law Group PLLC

(57) ABSTRACT

A unitized electrode assembly (10; 110; 210; 310; 410) for a fuel cell includes, in addition to an anode catalyst layer (54; 254) and a cathode catalyst layer (56; 256), a polymer electrolyte membrane (52) having an acid functional group normally including $H^+$ ions and an edge seal (66; 166; 266, 366, 466) containing alkali metal ions in a form, concentration, and/or location for delivery and dispersion into the membrane. The edge seal of the unitized electrode assembly is proximate, and typically contacts, the peripheral edge region (68) of the membrane in ion-transfer relation therewith, and alkali metal ions leach into the membrane during fuel cell operation to provide a desired ion exchange in the membrane. The alkali metal ions contained by the edge seal may be $Li^+$, $Na^+$, $K^+$, $Rb^+$, and/or $Cs^+$, and may be included as a dopant with the material of the edge seal during its formation, or may be included as a discrete component of the edge seal, as by an ion-doped strip of membrane material contained by the edge seal. The edge seal thus serves as a "reservoir" of the alkali metal ions for release to the polymer electrolyte membrane for increased durability.

20 Claims, 3 Drawing Sheets

(56) References Cited

U.S. PATENT DOCUMENTS

| | | |
|---|---|---|
| 2005/0031935 A1 | 2/2005 | Dave et al. |
| 2005/0136308 A1 | 6/2005 | Andrews et al. |
| 2007/0117000 A1 | 5/2007 | An et al. |
| 2007/0184326 A1 | 8/2007 | Sompalli et al. |
| 2008/0038612 A1 | 2/2008 | Fay et al. |
| 2008/0096090 A1 | 4/2008 | Cipollini et al. |
| 2008/0138688 A1 | 6/2008 | Prevoir et al. |
| 2009/0092886 A1 | 4/2009 | Brush et al. |
| 2011/0045382 A1 | 2/2011 | Mittal et al. |

FOREIGN PATENT DOCUMENTS

| | | |
|---|---|---|
| WO | 2006071234 A1 | 7/2006 |
| WO | WO 2009157894 A1 * | 12/2009 |

OTHER PUBLICATIONS

International Search Report, mailed May 30, 2011, for International Application No. PCT/US2010/002560, 2 pages.

* cited by examiner

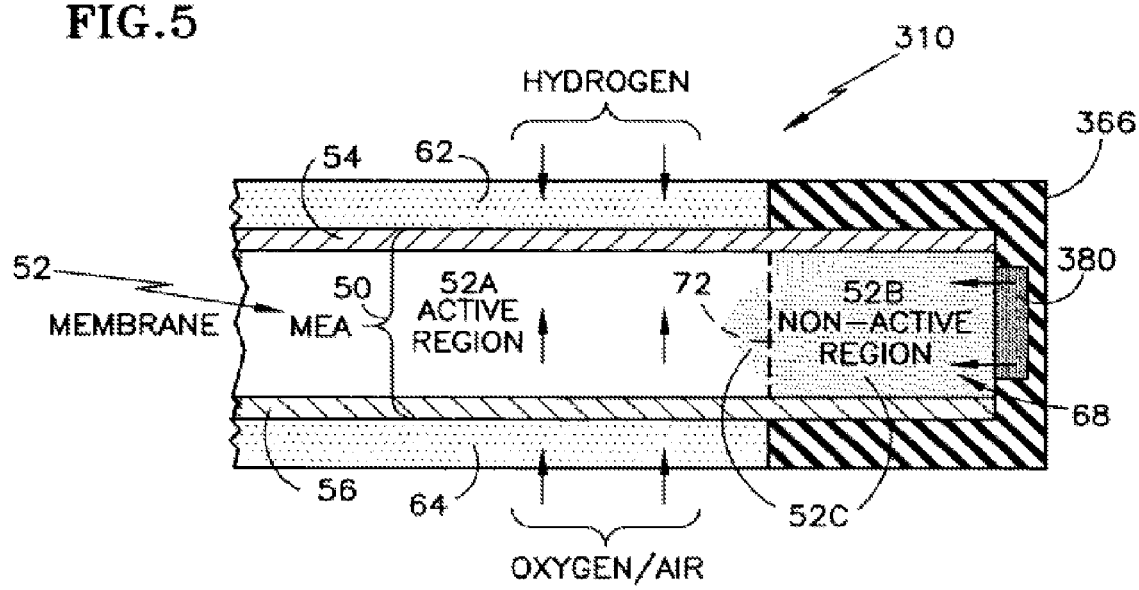
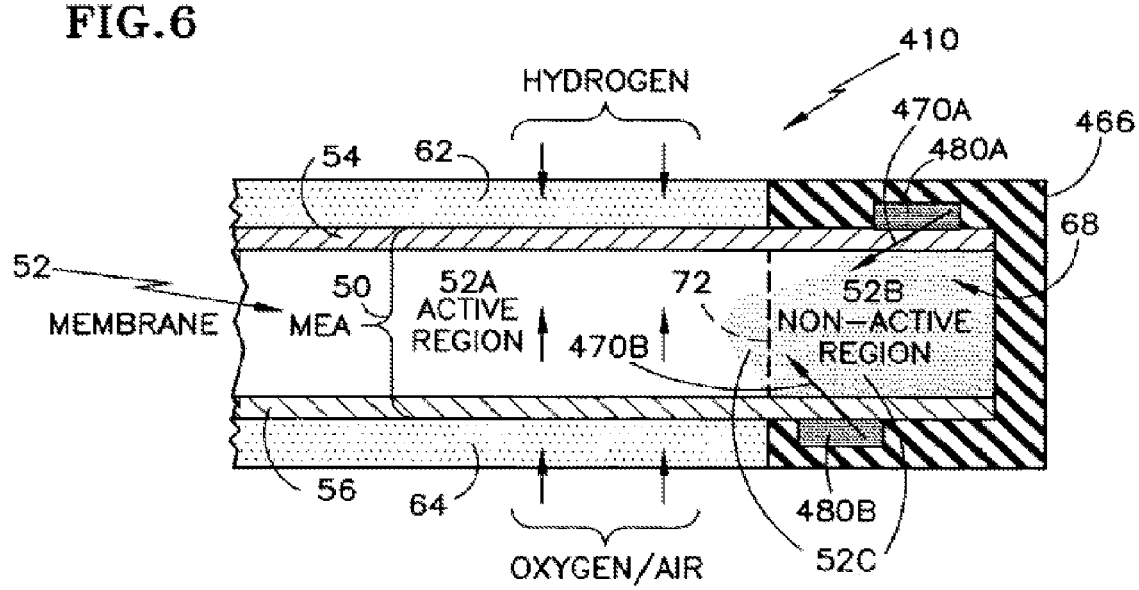

PROTECTIVE EDGE SEAL HAVING ALKALI METAL IONS FOR MEMBRANE ION EXCHANGE

BACKGROUND

The disclosure relates generally to a protective arrangement for membrane ion exchange, and more particularly to such protective arrangement for membrane ion exchange for use in electrochemical fuel cells, such as PEM fuel cells. More particularly still, the disclosure relates to such protective arrangement for membrane ion exchange providing increased durability.

A PEM fuel cell employs a membrane electrode assembly (MEA) in which the membrane is a proton exchange membrane, or polymer electrolyte membrane, (PEM). The membrane is disposed between anode and cathode electrodes respectively. The catalyzed cathode and anode serve to induce the desired electrochemical reactions. In addition to the aforementioned elements which comprise the membrane electrode assembly, there may be gas diffusion layers positioned outside of the electrodes. Cumulatively, these various elements comprise a unitized electrode assembly (UEA).

Reactants, typically an oxidant such as oxygen or air and a fuel such as hydrogen, are flowed over respectively opposite sides of the membrane to obtain the requisite electrochemical reaction. A seal about the perimeter of the membrane electrode assembly or the unitized electrode assembly normally serves to keep the reactants separate. This seal creates a non-active region portion to the membrane with respect to the desired electrochemical reaction.

The membranes typically used in a PEM fuel cell have been polymer electrolyte membranes having cation exchange groups, and have included hydrocarbon-based membranes or those prepared from fluoropolymers, and which contain sulfonic acid functional groups. A representative perfluorosulfonic acid/PTFE copolymer membrane is available from DuPont Inc. under the trade name Nafion®.

From the standpoint of financial cost and system reliability, the durability and operational lifetime of a fuel cell are important. Unfortunately, failure modes may exist which have an adverse impact. One such mode involves the degradation of the membrane. This matter is discussed in PCT Application PCT/US2004/044013 having International Publication Number WO 2006/071234, which describes how oxygen may diffuse from the cathode to the anode through the membrane and can form peroxide by reacting with hydrogen at low potential at the anode catalyst surface. The peroxide can dissociate into highly reactive free radicals, which in turn may rapidly degrade the membrane. That published application describes an arrangement for extending not only the membrane, but also the catalyzed layers and possibly the electrodes into the non-active region associated with the edge seal. In this way, oxygen and/or hydrogen and any resulting peroxide which diffuses into the edge seal area are consumed by the catalyzed layers to prevent decomposition of the membrane.

U.S. application Ser. No. 10/738,962, published as U.S. Patent Application Publication 2005/0136308, describes the application of an additive non-uniformly to the MEA to address much the same problem. The additive is selected from "a radical scavenger, a membrane cross-linker, a hydrogen peroxide decomposition catalyst and a hydrogen peroxide stabilizer". A number of examples are provided of additives that may serve to provide at least one of the aforementioned four functions. The principal focus of these additives is to interact with hydrogen peroxide in a manner that reduces the adverse nature of the peroxide itself. It suggests that the additive(s) be located in regions of the membrane subject to greatest potential chemical degradation.

While some advantages may be realized through the use of one or both of the aforementioned arrangements, they nevertheless remain deficient with respect to long term stability and structural integrity, or durability. One particular adverse characteristic is membrane degradation, which may be monitored by measuring one or more parameters, such as the rate of fluoride release in the instance of a fluoropolymer-based membrane. Generally speaking, the greater the rate of fluoride release from such a membrane, the greater the rate of membrane degradation. This release of fluoride may be a function of the formulation of the membrane material and is, for a given material formulation, strongly dependant on the operating conditions of the fuel cell in which the membrane is used. It has been observed that under accelerated load cycling conditions, membrane degradation is more severe in the active area's seal edge region compared to the rest of the active area. Although the reasons for such degradation are not fully understood, they perhaps include local conditions of heat and/or dryness. Still further, most of the prior art addresses only one of the components of membrane degradation—either mechanical or chemical—and most offer solutions that target solely chemical causes of membrane degradation.

SUMMARY

A recent development, disclosed in PCT Application PCT/US2008/007848 having International Publication Number WO 2009/157894 and commonly owned with the present application, is that of a polymer electrolyte membrane for a fuel cell comprising a polymer having an acid functional group normally including $H^+$ ions, and having alkali metal ions (of $Li^+$, $Na^+$, $K^+$, $Rb^+$, and Cs+) at least partially ion-exchanged with the ions of the acid functional group of the membrane. As used therein and herein, the term "partially ion exchanged" may mean a partial exchange of ions, or an exchange of ions in a part of the membrane, or both. The polymer electrolyte membrane, typically a sulfonated fluorocarbon, is at least partly bathed in a solution containing the alkali metal ions for some period to effect or implement, the desired partial ion exchange prior to assembly of the membrane into a unitized electrode assembly. In a typical example, portions of a membrane already in the protonated form ($H^+$) are bathed in a solution containing the alkali metal ions to provide increased durability to those portions, typically associated with the non-active regions of the fuel cell under the edge seal. While this arrangement yields a membrane with increased durability, it nevertheless requires preparation of the membrane (via ion exchange of part of the membrane) in a time-consuming and possibly cumbersome manner.

Disclosed herein is an arrangement for a unitized electrode assembly for a fuel cell which includes a polymer electrolyte membrane having an acid functional group normally including $H^+$ ions and further includes an edge seal that contains alkali metal ions in a form, concentration, and/or location for delivery and dispersion into the membrane following assembly and typically during operation. The edge seal of the unitized electrode assembly is proximate the peripheral edge region of the membrane in ion-transfer relation therewith, and is normally in contact with the periphery of the polymer electrolyte membrane, typically at the membrane end face and possibly somewhat inward thereof as well, and alkali metal ions leach directly, or indirectly through an electrode, into the membrane during fuel cell operation to provide the desired partial ion exchange in the membrane. The alkali metal ions contained with the edge seal may be Li+, Na+, K+, Rb+, and/or Cs+, and are included or contained as a dopant, perhaps intermixed with the material of the edge seal during its formation or, alternatively, as a discrete zone, portion, or component part contained by the edge seal, as for example a separate included strip of polymer electrolyte membrane material doped with the alkali metal ions. The edge seal thus serves as a "reservoir" of the alkali metal ions for release to the polymer electrolyte membrane.

The composition and/or structure of the edge seal and contained alkali metal ions may be controlled to assure factors such as rate, duration, and/or location of delivery of the alkali metal ions to the polymer membrane. In an example embodiment, the alkali metal ion-doped edge seal may be formed to provide relatively greater release of alkali metal ions to selected regions of the periphery of the polymer membrane likely to experience the greatest loss of chemical and/or mechanical durability, as for example hot/dry areas of the membrane that result from the configuration of reactant and/or coolant flow fields.

BRIEF DESCRIPTION OF THE DRAWINGS

FIG. 5 is a schematic illustration somewhat similar to FIG. 1, depicting the alkali metal ion-doped edge seal in accordance with a still further disclosed embodiment in which polymer electrolyte membrane material doped with the alkali metal ions is incorporated as a discrete portion of the seal; and FIG. 6 is a schematic illustration similar to FIG. 5, depicting the alkali metal ion-doped edge seal in accordance with an even further disclosed embodiment.

DETAILED DESCRIPTION

Figure 1:
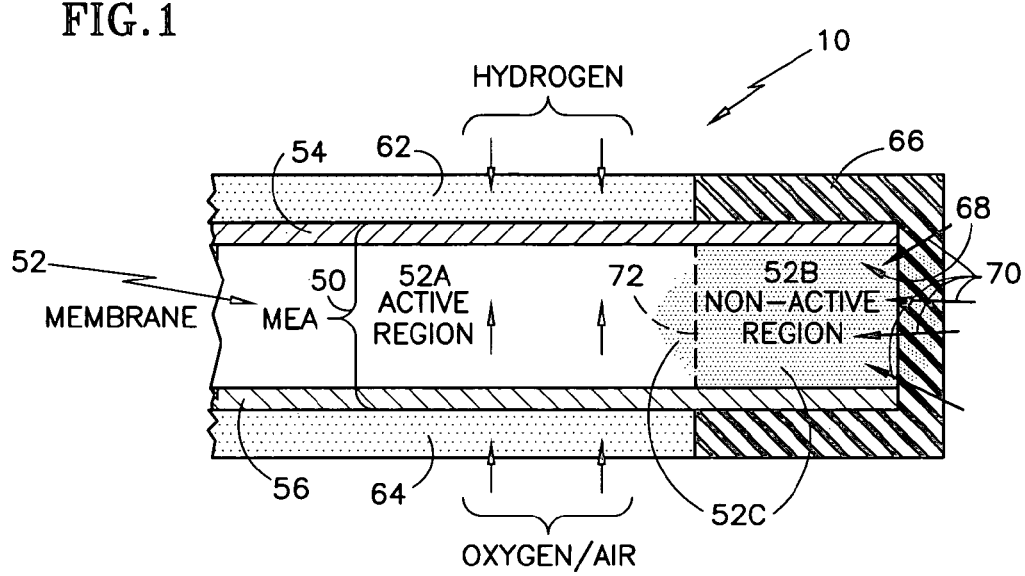
FIG. 1 schematically illustrates the edge region of a unitized electrode assembly (UEA) including a membrane electrode assembly (MEA) and an alkali metal ion-doped edge seal in accordance with one disclosed embodiment in which alkali metal ions are integrally intermixed with the material of the seal.

FIG. 1 shows a unitized electrode assembly (UEA) 10 including a membrane electrode assembly (MEA) 50 having a membrane 52, an anode catalyst layer 54 positioned to one side of membrane 52, and a cathode catalyst layer 56 positioned to the other side of membrane 52. The anode catalyst layer 54 and the cathode catalyst layer 56 are each typically in contact with the membrane 52. Gas diffusion layers 62, 64 are positioned outside of catalyst layers 54, 56 and are used for introduction of reactants, hydrogen and oxygen/air, as shown in the drawing. Also, a seal 66 is positioned at an edge, or edge region, 68 of membrane electrode assembly 50 for purposes of sealing the UEA 10. However, as will be described hereinafter in detail, the seal 66 disclosed herein is of novel composition and/or structure and additional function, being doped with alkali metal ions for leaching into the peripheral region of membrane 52.

To further assist with an understanding of various aspects of the disclosure, the MEA 50, and particularly membrane 52, is depicted as having an Active Region 52A which is generally conductive, as indicated by charge flow arrows therein, and a Non-Active Region 52B which is typically isolated or shadowed from the flow of the reactants by the presence of the seal 66. The non-active region typically is in the region of the periphery of the membrane 52 and at least underlies any overlying portion of the seal 66, as generally represented by the broken line 72, but may of course be somewhat greater or less than the bounds of the seal 66 itself and need not be as conductive as the active region. Thus, the Non-Active Region 52B and the edge region 68 of the membrane 52 are approximately one and the same, with the edge seal 66 overlying that region of the membrane Moreover, the Non-Active Region 52B under the seal 66 to the right of the broken line 72 and also a portion of the membrane somewhat to the left of that broken line is depicted as shaded in FIG. 1 and identified by reference number 52C to further emphasize the presence, or relatively increased concentration, of alkali metal ions, as will be described in greater detail. It will be understood that although the overall durability of the membrane 52 might be enhanced by the alkali metal ion exchange described herein, it comes at the expense of reduced $H^+$ ion conductivity in regions where it occurs. This thus guides a judicious usage of such exchange to regions of normally-reduced need for such conductivity, such as the so-called Non-Active Regions 52B.

The composition of a typical membrane 52 in a typical MEA is of a fluoropolymer or similar non-fluorinated polymer having an acid functional group, with a typical example being a perfluorosulfonic acid/PTFE co polymer membrane available from DuPont Inc. under the trade name Nafion®. It has been found that exchange of alkali metal ions for at least some of the hydrogen ions in the conventional acid functional groups that otherwise exist in the copolymer membrane serves to enhance the durability of the membrane, at least in the region(s) of the membrane where such substitution of ions occurs. While not wishing to be bound thereby, it is believed that the exchange of alkali metal ions for $H^+$ ions stabilizes the vulnerable membrane sites which are prone to chemical, mechanical and/or thermal degradation, thus increasing the overall membrane stability and durability. The extent to which this ion exchange is taken, perhaps expressed as exchanged ion concentration, may vary from as low as 0% or 1% near or within the Active Region 52A, to as high as near 100% in the Non-Active Region 52B closest to the source of the alkali metal ions, with the need for conductivity and/or cost of making the exchange being two major factors to be considered. The tradeoff is that it is desired to increase the level of the alkali metal ions at a site as the durability of the membrane at that site declines.

Substitution/exchange of any of the alkali metal ions ($Li^+$, $Na^+$, $K^+$, $Rb^+$, $Cs^+$) is believed to provide the advantages described. To the extent the following discussion mentions a specific alkali metal ion as an example, it will be in the context of $Na^+$ ions for reasons of cost and availability, but of course the other alkali metals could be used instead, or in addition.

In the normal course of usage of polymer electrolyte membranes in fuel cells, the membrane material is typically supplied in the perfluorosulfonic acid/PTFE copolymer form, from suppliers such as Dupont Inc, Gore, Asahi, and others. The DuPont product is sold under the well-known trade name Nafion®, and it and similar products of others may be referred to generally herein as "Nafion-like". That membrane material is today typically available in the protonated form, possessing $H^+$ ions available for conduction. From that point, it is then possible to ion-exchange alkali metal ions, leached from edge seal 66, into the membrane to preferentially exist at the sulfonic group of the membrane, as described herein.

The edge seal 66 in the embodiment of FIG. 1 and some of the following embodiments is formulated and formed in a generally known manner and mostly of conventional, gas-impervious materials, with the notable difference that the composition now additionally includes (is "doped" with), alkali metal ions selected from the group consisting of $Li^+$, $Na^+$, $K^+$, $Rb^+$, and Cs. In the several Figures referenced herein, the alkali metal ions are graphically depicted by stippling in the edge seal 66 and/or the membrane 52, but are not separately identified by a reference number. The principal material of the edge seal 66 may conveniently be a thermoplastic film such as polyvinylidene chloride (KYNAR®), or an elastomer, such as a silicone rubber. A salt of the selected alkali metal may be admixed or otherwise suitably combined with the base material of the seal 66 prior to or during the formation of the seal. The seal may be preformed for set-in-place assembly with the MEA 50 during the assembly of the UEA 10, or it may be formed in place as an integral part of the MEA50/UEA10, as by injection or extrusion, following their initial assembly.

The edge seal 66 doped with the alkali metal ions is thus positioned to serve as a "reservoir", leaching the stored alkali metal ions into the abutting, or proximate, regions of the membrane 52, such as edge region 68 that includes the end face and/or peripheral regions, of the membrane 52 with which it is in suitable direct or indirect contact. Although in FIG. 1 the "reservoir" of alkali metal ions is depicted as being only in the connecting end segment of the edge seal 66, it should be understood that it might also include the arm segments which overlie the catalyst layers 54 and 56, and the alkali ions would leach through those catalyst layers to the membrane 52, albeit with somewhat greater resistance than the path of direct contact. Because the alkali-sulfonic coupling is stronger than proton-sulfonic coupling, the alkali metal ions preferentially occupy the sites otherwise occupied by the protons which will leave the membrane, and the alkali ions thereby serve to maintain the integrity of the membrane in that region. With further reference to FIG. 1, the several arrows designated 70 represent the migration, or leaching, of alkali metal ions from the edge seal 66 into the peripheral region of the membrane 52 here represented by the Non-Active Region 52B. More specifically, the stippling in the region designated 52C is intended to graphically represent the extent and relative concentration of alkali metal ions leached from the edge seal 66 into the periphery of membrane 52. The driving force of the alkali metals is the concentration difference between the doped seal area and the undoped active region of the membrane 52.

Figure 2:
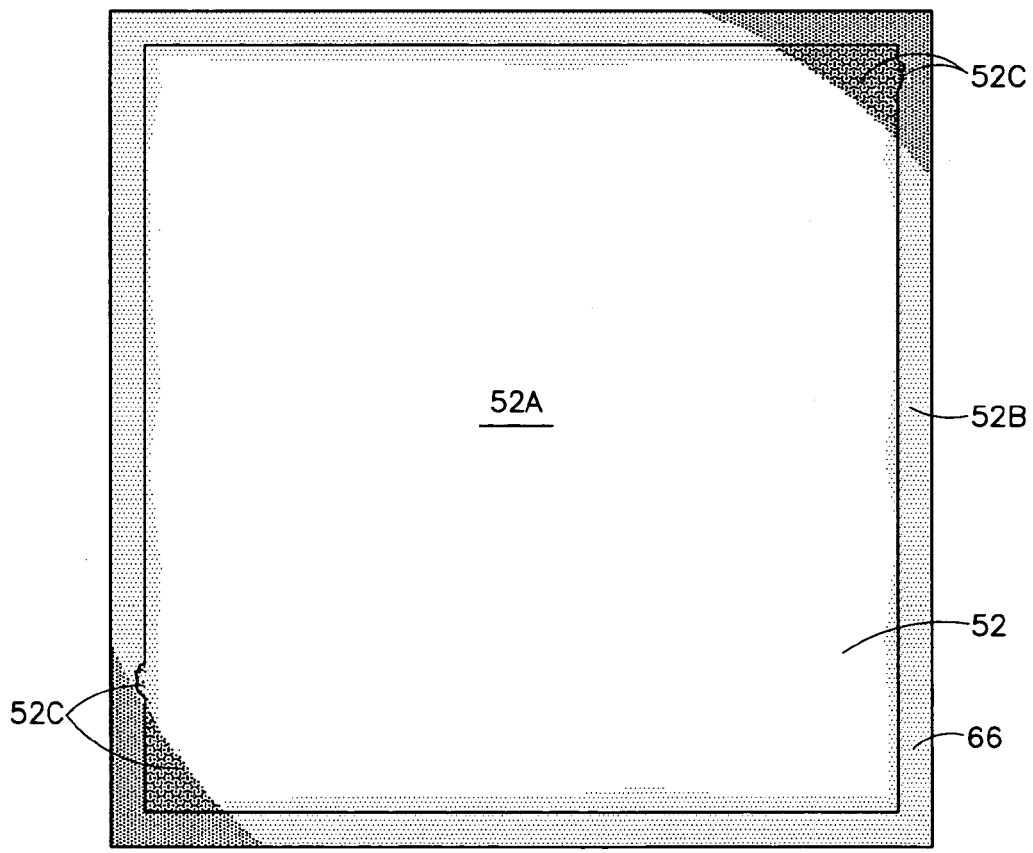
FIG. 2 is a simplified plan-form view of a membrane and an alkali metal ion-doped edge seal showing diffusion of the alkali metal ions into a peripheral region of the membrane in accordance with an aspect of the disclosure.

It will be understood that the concentration of alkali metal ions preloaded in the edge seal 66 may be a function of the level of need contemplated for such ions for the membrane 52 and, perhaps more significantly, that concentration may be varied as a function of position about the periphery of membrane 52. For instance, if the loss of chemical and mechanical integrity or durability of the membrane 52 is anticipated to be greatest in certain hot/dry regions of the membrane periphery associated with coolant and/or reactant flow fields, the concentration of alkali metal ions provided in those corresponding regions of the edge seal 66 may be relatively greater than elsewhere. This variation in the patterning of alkali metal ion concentration, originally in the edge seal 66 and subsequently, following leaching, in the membrane 52, is depicted in FIG. 2. The plan form view of membrane 52 and edge seal 66 graphically depicts, via stippling, the patterning 52C of the alkali metal ions, especially following leaching into the membrane, illustrating regions of relatively greater and lesser concentrations of the ions. For example, the membrane 52 may experience relatively hot/dry conditions near the upper right and lower left corners in FIG. 2, and thus the concentrations of alkali metal ions contained by edge seal 66 are greater in those regions and the ions leach relatively farther toward or into the active area 52A in those regions. In addition to controlling the concentration of the alkali metal ions in the edge seal 66, the basic composition of the seal material itself may be selected to provide appropriate density and/or porosity with respect to the desired leaching of the alkali metal ions.

Figure 3:
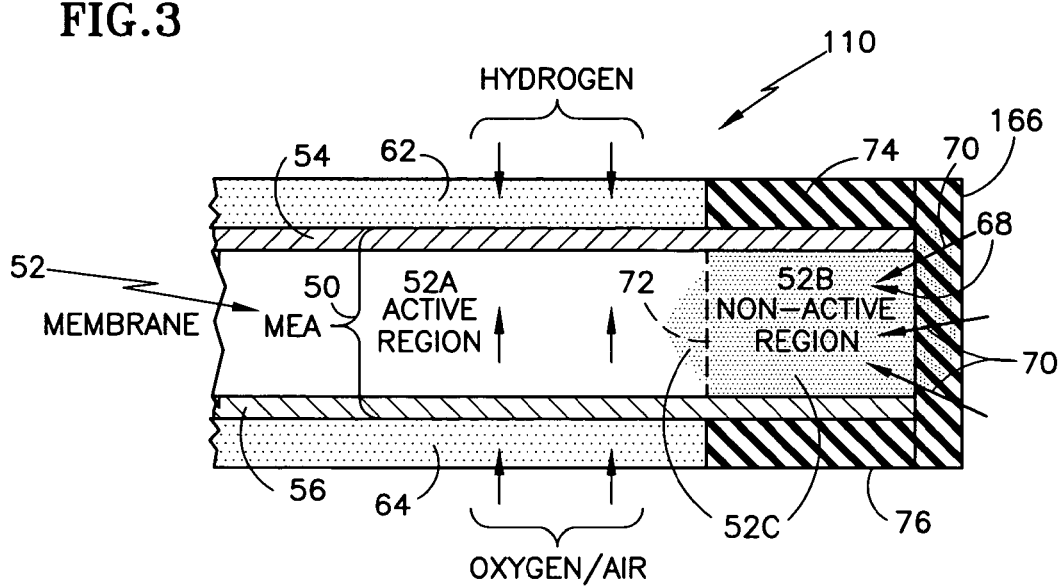
FIG. 3 is a schematic illustration similar to FIG. 1, depicting a simplified alkali metal ion-doped edge seal in accordance with another disclosed embodiment.

Referring to FIG. 3, there is disclosed and depicted an embodiment of a UEA 110 similar in most respects to that of FIG. 1, but which differs in the structure of edge seal 166. The same elements are given the same reference numbers, functionally similar elements that differ somewhat are similarly numbered but with a "1" prefix, and new/different elements are given new reference numbers. The unitized electrode assembly (UEA) 110 includes a membrane electrode assembly (MEA) 50 having a membrane 52, an anode catalyst layer 54 positioned to one side of membrane 52, and a cathode catalyst layer 56 positioned to the other side of membrane 52. The anode catalyst layer 54 and the cathode catalyst layer 56 are each typically in contact with the membrane 52. Gas diffusion layers 62, 64 are positioned outside of catalyst layers 54, 56 and are used for introduction of reactants, hydrogen and oxygen/air, as shown in the drawing. In this embodiment the edge seal 166 is of a simple band-like shape positioned about the outermost end of edge region 68 of membrane electrode assembly 50 for the purposes of sealing the UEA 110. Resilient gaskets 74 and 76, for example made of silicone rubber closed cell foam, overlie the peripheral regions of the electrode catalyst layers 54 and 56 respectively, and thereby functionally replace corresponding portions of seal 66 of the FIG. 1 embodiment. The present edge seal 166 contains alkali metal ions in the same manner and similarly located as previously described. Those ions leach from seal 166 inwardly into the membrane 52, as represented by the arrows 70 and stippling 52C, and replace H+ ions as previously described.

Figure 4:
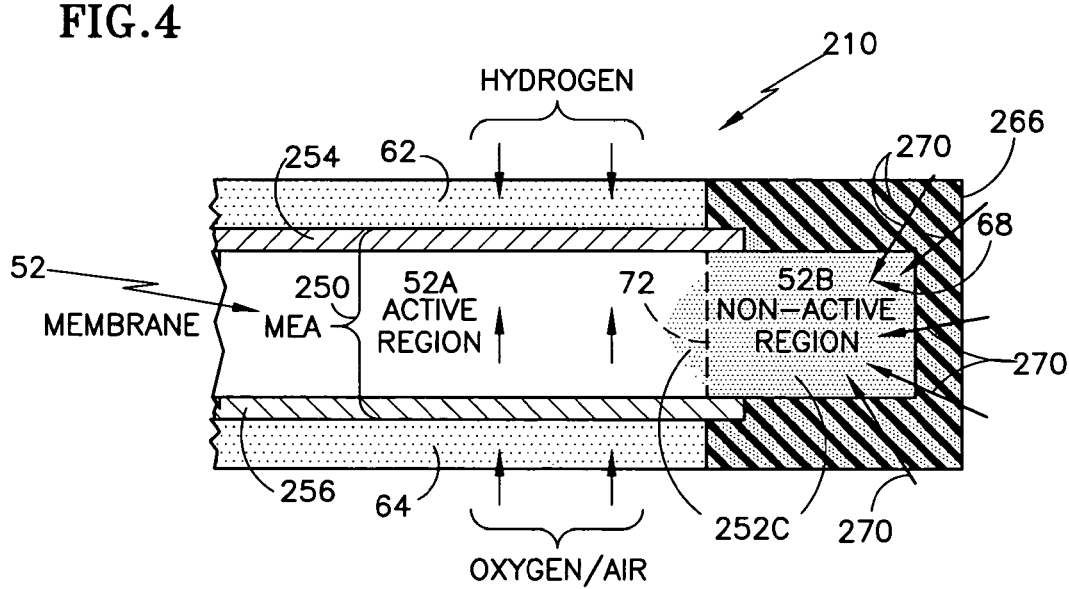
FIG. 4 is a schematic illustration similar to FIG. 1, depicting the alkali metal ion-doped edge seal in accordance with yet another disclosed embodiment.

Referring to FIG. 4, there is disclosed and depicted an embodiment of a UEA 210 similar in most respects to that of FIG. 1, but which differs in the structure of the MEA 250 and edge seal 266. The same elements are given the same reference numbers, functionally similar elements that differ somewhat are similarly numbered but with a "2" prefix, and new/different elements are given new reference numbers. The unitized electrode assembly (UEA) 210 includes a membrane electrode assembly (MEA) 250 having a membrane 52, an anode catalyst layer 254 positioned to one side of membrane 52, and a cathode catalyst layer 256 positioned to the other side of membrane 52. The anode catalyst layer 254 and the cathode catalyst layer 256 are each typically in contact with the membrane 52. Unlike the embodiment of FIG. 1, the present anode catalyst layer 254 and cathode catalyst layer 256 do not extend the full length of the membrane 52 to its distal end, thereby reducing electrode catalyst costs. Gas diffusion layers 62, 64 are positioned outside of catalyst layers 254 and 256, and are used for introduction of reactants, hydrogen and oxygen/air, as shown in the drawing. The gas diffusion layers 62, 64 and the catalyst layers 254 and 256 may be substantially coextensive, such that in this embodiment the edge seal 266 is shaped similarly to the FIG. 1 embodiment, with the seal overlying not only the distal end of the membrane 52, but also the membrane's upper and lower peripheral portions cumulatively forming the edge region 68, for the purposes of sealing the UEA 210. With the catalyst layers 254 and 256 no longer positioned between the seal 266 and the membrane 52, the alkali metal ions are conveniently distributed through the entirety of the seal and leach into the membrane 52 over a larger surface area of the edge region 68 with which they are in mutual contact, as depicted by arrows 270 and the stippled region 252C. It will be understood, as noted previously, that even if the catalyst layers 254 and 256 extended a greater distance so as to be positioned between the seal 266 and the membrane 52, the alkali ions would leach through those catalyst layers to the membrane 52, albeit with somewhat greater resistance than the path of direct contact.

Reference is now made to the example embodiments of FIGS. 5 and 6, which are similar to the embodiments of FIGS. 1-4 in that they also depict edge seals that contain "reservoirs" of alkali metal ions for leaching into the membrane 52, but which differ in that the alkali metal ions are contained separately by the edge seal and are not intermixed with the material which forms that edge seal.

More specifically, referring to FIG. 5, the same elements (as previously) are given the same reference numbers, functionally similar elements that differ somewhat are similarly numbered but with a "3" prefix, and new/different elements are given new reference numbers. The unitized electrode assembly (UEA) 310 includes a membrane electrode assembly (MEA) 50 having a membrane 52, an anode catalyst layer 54 positioned to one side of membrane 52, and a cathode catalyst layer 56 positioned to the other side of membrane 52. The anode catalyst layer 54 and the cathode catalyst layer 56 are each typically in contact with the membrane 52. Gas diffusion layers 62, 64 are positioned outside of catalyst layers 54, 56 and are used for introduction of reactants, hydrogen and oxygen/air, as shown in the drawing. In this embodiment, the edge seal 366 may be similar to that of FIG. 1 in general shape and appearance, and perhaps also in terms of the base thermoplastic film or elastomer material of the seal, but it contains a discrete "reservoir" 380 in which the alkali metal ions are concentrated. For example, the alkali metal ion reservoir 380 may conveniently be a strip or band, continuous or otherwise, of material similar to membrane 52 which has been previously doped or loaded with the requisite alkali metal ions, as by bathing in a solution containing the alkali metal ions. The alkali metal ion reservoir strip 380 may be contained by the edge seal 366 in various manners, including by positioning the reservoir strip 380 in contact with the outermost end of edge region 68 and then injection-forming the edge seal 366 about it; by pre-forming the edge seal 366 to contain a suitable seat, and then placing and/or affixing the reservoir strip 380 in the seat; or simply molding the alkali metal ion reservoir strip 380 with the edge seal 366 prior to assembly of the UEA 310. In each instance, the positioning of the alkali metal ion reservoir strip 380 is such that when the edge seal 66 is in place about the UEA 310, the strip is in contact or at least proximity, with the edge region 68 to enable the alkali metal ions to leach into the membrane 52.

Referring to FIG. 6, the same elements (as previously) are given the same reference numbers, functionally similar elements that differ somewhat are similarly numbered but with a "4" prefix, and new/different elements are given new reference numbers. The unitized electrode assembly (UEA) 410 includes a membrane electrode assembly (MEA) 50 having a membrane 52, an anode catalyst layer 54 positioned to one side of membrane 52, and a cathode catalyst layer 56 positioned to the other side of membrane 52. The anode catalyst layer 54 and the cathode catalyst layer 56 are each typically in contact with the membrane 52. Gas diffusion layers 62, 64 are positioned outside of catalyst layers 54, 56 and are used for introduction of reactants, hydrogen and oxygen/air, as shown in the drawing. The embodiment of FIG. 6 is quite similar in most respects to that of FIG. 5, with the further distinction that it depicts alkali metal ion reservoir strips 480A and 480B contained in the arm portions of an edge seal 466 that overlie and contact the anode catalyst layer 54 and cathode catalyst layer 56, to connote the ability of the alkali metal ions to leach through the catalyst layers to the membrane 52, as depicted by the ion migration arrows 470A and 470B. Moreover, each of the alkali metal ion reservoir strips 480A and 480B has been depicted at a different location or spacing relative to the outermost end of edge region 68 to convey the ability to vary the positioning, and thus relative concentrations, of the reservoirs of alkali metal ions. It will also be understood that similar variations in ion concentration around the perimeter of the edge seal 466, and thus UEA 410, as similarly depicted with respect to FIG. 2, may also be obtained by including and omitting portions of the alkali metal ion reservoir strips 480 at selected locations about the perimeter, and/or by variations in the initial ion loading concentration in those alkali metal ion reservoir strips.

Although the disclosure has been described and illustrated with respect to the exemplary embodiments thereof, it should be understood by those skilled in the art that the foregoing and various other changes, omissions and additions may be made without departing from the spirit and scope of the disclosure.

What is claimed is:

1. A unitized electrode assembly for a fuel cell, comprising:
    a membrane including a peripheral edge region adjacent to a peripheral edge of the membrane, the membrane including hydrogen ions coupled with the membrane by proton-sulfonic coupling;
    an anode catalyst layer positioned at a first side of the membrane;
    a cathode catalyst layer positioned at a second side of the membrane; and
    an edge seal proximate to, and in ion-transfer relation with, the peripheral edge region of the membrane, the edge seal containing alkali metal ions capable of leaching into at least the peripheral edge region, wherein an alkali-sulfonic coupling of the alkali metal ions with the membrane is stronger than the proton-sulfonic coupling of the hydrogen ions with the membrane to drive the leaching.

2. The unitized electrode assembly of claim 1 wherein the alkali metal ions contained by the edge seal are from the group consisting of: $Li^+$, $Na^+$, $K^+$, $Rb^+$, and $Cs^+$.

3. The unitized electrode assembly of claim 2 wherein the membrane is a sulfonated, at least partly fluorinated, hydrocarbon polymer.

4. The unitized electrode assembly of claim 2 wherein the edge seal is comprised of a formable material and the alkali metal ions are intermixed therein as an included dopant.

5. The unitized electrode assembly of claim 2 wherein the edge seal is comprised of a formable material and the alkali metal ions are contained in the edge seal as a separate component thereof.

6. The unitized electrode assembly of claim 5 wherein the separate component containing the alkali metal ions comprises polymer electrolyte membrane material doped with the alkali metal ions.

7. The unitized electrode assembly of claim 1 wherein the membrane includes a polymer having an acid functional group including $SO_3H$.

8. The unitized electrode assembly of claim 1 wherein the membrane is a sulfonated, at least partly fluorinated, hydrocarbon polymer.

9. The unitized electrode assembly of claim 1 wherein the alkali metal ions in the edge seal are of one concentration in a first portion of the edge seal and a different concentration in a second portion of the edge seal.

10. The unitized electrode assembly of claim 9 wherein said second portion of the edge seal is positioned in a region of the unitized electrode assembly exposed to relatively warmer or drier conditions than for said edge seal first portion during operation of a fuel cell, and said different concentration of alkali metal ions is relatively greater than for said first portion.

11. The unitized electrode assembly of claim 1 wherein the edge seal is in gas-sealing engagement with at least the anode catalyst layer, the cathode catalyst layer, and a peripheral end face of the membrane.

12. A fuel cell comprising:
an anode;
a cathode;
a membrane positioned between the anode and the cathode and having a peripheral edge, the membrane including hydrogen ions coupled with the membrane by proton-sulfonic coupling; and
an edge seal including alkali metal ions, the edge seal in contact with the anode, the cathode, and the peripheral edge of the membrane, wherein an alkali-sulfonic coupling of the alkali metal ions with the membrane is stronger than the proton-sulfonic coupling of the hydrogen ions with the membrane to drive the leaching.

13. The fuel cell of claim 12 wherein the alkali metal ions included in the edge seal are from the group consisting of: $Li^+$, $Na^+$, $K^+$, $Rb^+$, and $Cs^+$.

14. The fuel cell of claim 12 wherein the membrane includes a polymer having an acid functional group including $SO_3H$.

15. The fuel cell of claim 12 wherein the membrane is a sulfonated, at least partly fluorinated, hydrocarbon polymer.

16. The fuel cell of claim 12 wherein the alkali metal ions included in the edge seal are of one concentration in a first portion of the edge seal and a different concentration in a second portion of the edge seal.

17. The fuel cell of claim 16 wherein said second portion of the edge seal is positioned in a region of the fuel cell exposed to relatively warmer or drier conditions than for said edge seal first portion during operation of the fuel cell, and said different concentration of alkali metal ions is relatively greater than for said first portion.

18. The fuel cell of claim 12 wherein the edge seal is in gas-sealing engagement with at least the anode, the cathode, and a peripheral end face of the membrane.

19. The fuel cell of claim 12 wherein the edge seal comprises a formable material and the alkali metal ions are intermixed therein as an included dopant.

20. The fuel cell of claim 12 wherein the edge seal comprises a formable material and the alkali metal ions are contained in the edge seal as a separate component thereof.

* * * * *